United States Patent [19]

Hall

[11] Patent Number: 5,692,226
[45] Date of Patent: Nov. 25, 1997

[54] STEREOSCOPIC RECORDING SYSTEMS UTILIZING CHIRAL LIQUID CRYSTALS

[76] Inventor: Dennis R. Hall, 7075 SW. Hoodview Pl., Beaverton, Oreg. 97008

[21] Appl. No.: 314,134

[22] Filed: Sep. 28, 1994

[51] Int. Cl.[6] .................................................. G03B 35/08
[52] U.S. Cl. ........................................... 396/326; 359/465
[58] Field of Search .............................. 348/42, 57, 58; 354/112, 114, 115, 116; 396/324, 326, 325, 331; 352/57, 58, 60; 359/462, 464, 465, 37, 65; 349/2, 3, 4, 80, 98, 115

[56] References Cited

U.S. PATENT DOCUMENTS

| | | | |
|---|---|---|---|
| 3,679,290 | 7/1972 | Adams et al. | 350/157 |
| 3,711,181 | 1/1973 | Adams et al. | 350/157 |
| 3,821,466 | 6/1974 | Roese | 358/92 |
| 3,990,087 | 11/1976 | Marks et al. | 359/465 |
| 4,021,846 | 5/1977 | Roese | 358/92 |
| 4,281,341 | 7/1981 | Byatt | 358/92 |
| 4,719,507 | 1/1988 | Bos | 358/92 |
| 4,884,876 | 12/1989 | Lipton et al. | 350/347 E |
| 5,050,961 | 9/1991 | Venolia et al. | 350/132 |
| 5,221,982 | 6/1993 | Faris | 359/38 |
| 5,260,773 | 11/1993 | Dischert | 348/42 |
| 5,325,218 | 6/1994 | Willett et al. | 359/65 |
| 5,398,131 | 3/1995 | Hall et al. | 359/465 |
| 5,457,554 | 10/1995 | Faris | 359/465 |

OTHER PUBLICATIONS

Faris, SID 91 Digest, 1991, pp. 840–843, "Micro–Polarizer Arrays Applied to a New Class of Stereoscopic Imaging".
Schadt & Funfschilling, 1990 Jpn. J. Appl. Phys., vol. 29, No. 10, pp. 1974–1984, "New Liquid Crystal Polarized Color Projection Principle".
Maurer, SID 90 Digest, 1990, pp. 110–113, "Polarizing Color Filters Made From Cholestric LC–Silicones".

Primary Examiner—A. A. Mathews

[57] ABSTRACT

Methods of recording and analyzing stereoscopic displays using chiral liquid crystal materials are presented. The methods include cameras that encode stereoscopic pictures in both the film and video formats.

25 Claims, 5 Drawing Sheets

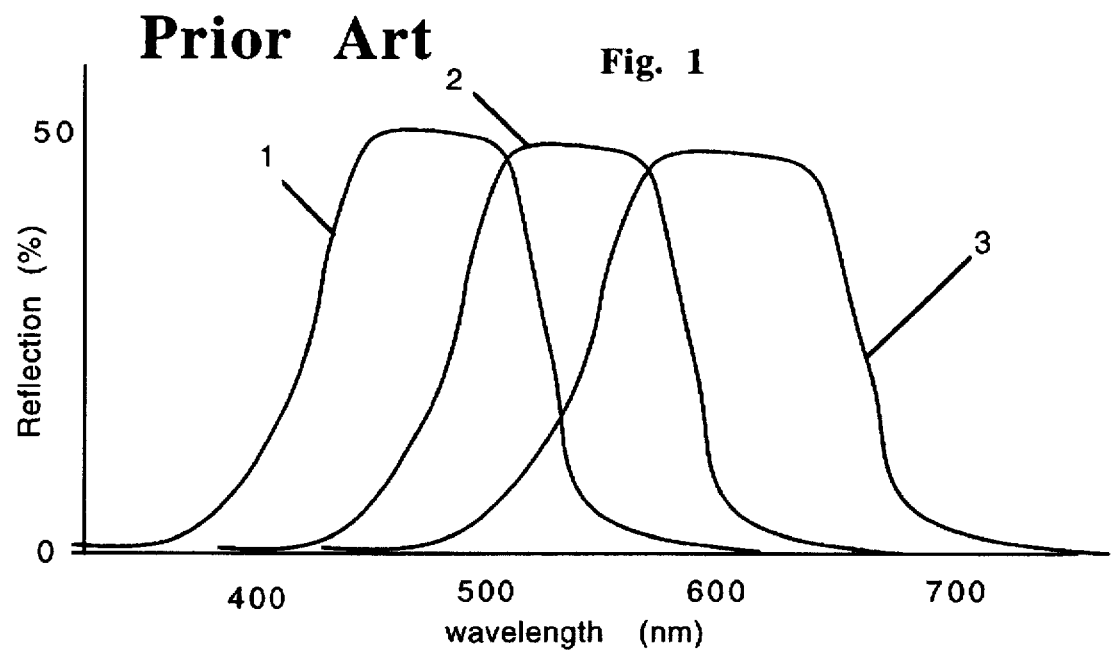
Prior Art  Fig. 1
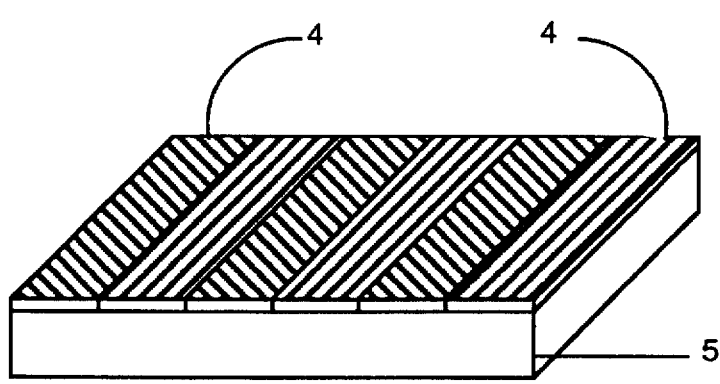
Prior Art  Fig. 2

Prior Art  Fig. 3
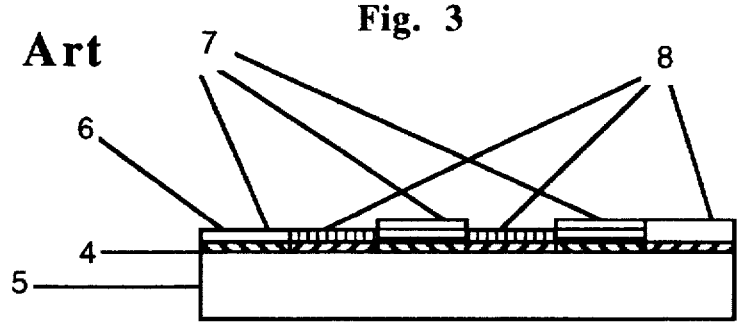
Fig. 4a
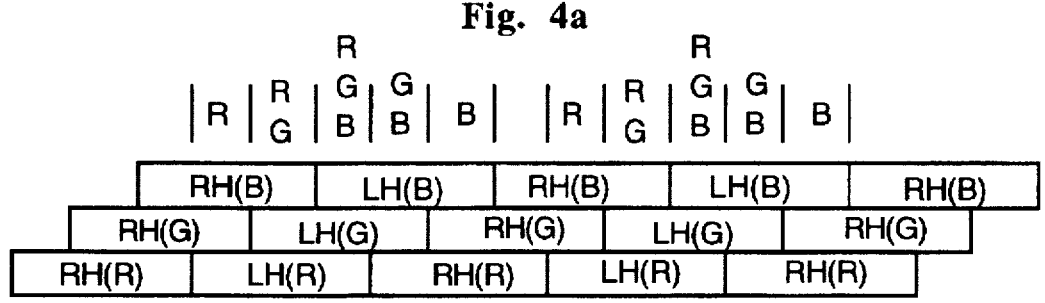
Fig. 4b
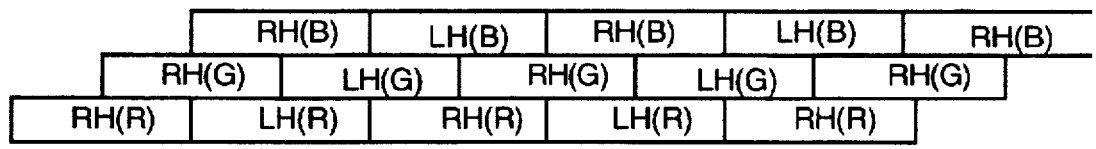

STEREOSCOPIC RECORDING SYSTEMS UTILIZING CHIRAL LIQUID CRYSTALS

BACKGROUND OF THE INVENTION

1. Statement of the Invention

This invention concerns stereoscopic recording systems that are in whole or in part, derived or facilitated by the use of cholesteric type liquid crystals, which can more generally be called Chiral Liquid Crystals (CLC), the nematic type being most common at the present time. This is intended to be a "Method and Design" application, based upon the inventions of U.S. patent application Ser. No. 07/929,673 now U.S. Pat. No. 5,398,131, U.S. patent application Ser. No. 08/291,666 and U.S. patent application Ser. No. 08/314,133, now abandoned and replaced by U.S. patent application Ser. No. 08/617,075. The contents of U.S. Pat. 5,398,131 and U.S. patent application Ser. No. 08/291,666 are hereby incorporated by reference herein.

2. Description of the Prior Art

In the history of projected stereoscopic displays, there have been two basic methods of encoding the SPVs to the viewer's eyes. These are by means of color (anaglyphic) and polarization encoding of the light of the display. Anaglyphic methods, wherein the two SPVs are presented to the viewer, with the encoding light or inks being of two colors and the SPVs are decoded to the viewer's individual eyes by colored glasses, which transmit to each eye, substantially, only the SPV intended for that eye. This technology lacks the ability to produce a large color gambit. The technique was very popular about 40 years ago and is still used to some degree, largely in print applications because it is inexpensive. Polarization encoding became popular to some degree after Land's invention of reasonably inexpensive linearly polarizing filters. In this technique two projectors are used, with each projector presenting a polarization encoded SPV upon a polarization preserving display screen, such that the SPVs can be decoded to the viewer's individual eyes by polarization decoding or analyzing glasses, which transmit to each eye, substantially, only the SPV intended for that eye. This system yields excellent full color images, but it suffers from complexities of every sort, because the method involves recording two perspective views (the SPVs), and if motion is involved, time synchronizing the SPVs, displaying the SPVs through dual projectors and properly converging these pictures upon the display screen. These problems are eliminated by using "Time Sequential Stereoscopic Displays". Time sequential SPVs are displayed upon a screen and shuttered glasses are worn by the viewer, with the shuttering of the individual lenses of the glasses, synchronized with the display, allowing light to pass to each of the viewer's eyes, only at the time that the SPV for that eye is displayed upon the display screen. Roese (U.S. Pat. Nos. 3,821,466 & 4,021,846), Lipton (U.S. Pat. No. 4,884,876) and others have developed techniques for shuttered glasses. Time sequential, polarization encoded SPVs from display devices, wherein passive polarization analyzing glasses are worn by the viewer, which transmit to the viewer's individual eyes, only the SPV intended for that eye are described in patents by Byatt (U.S. Pat. No. 4,281,341) and Bos (U.S. Pat. No. 4,719,507). In the devices of this type, the SPVs are displayed time sequentially, a polarizer is placed in front of the display and an active cell, which can leave the polarization of the display unaffected or change the polarization to an orthogonal state, is placed between the display's polarizer and the viewer, so that SPVs, which are polarization encoded, are displayed time sequentially and with the analyzing glasses, each of the viewer's eyes sees the SPV intended for that eye. An accompanying patent application relates to the patents of Byatt, Bos and Lipton, wherein their devices present polarization encoded images of mixed SPVs of single and mixed handedness Circularly Polarized Light (CPL) and other so encoded displays. This application relates to cameras to be used with the devices of said application. A more recent stereoscopic innovation is the interlaced polarization encoded displays, wherein the SPVs are presented simultaneously in an interlaced pattern, with each SPV encoded to the viewer's individual eyes by a polarization inducing medium placed over the interlaced SPVs, such that the light transmitted to each of the individual's eyes is only the light from the SPV intended for that eye, when polarization analyzing glasses are worn by the viewer. Venolia (U.S. Pat. No. 5,050,961) describes such a method, where the Polarization Encoding Medium (PEM) is placed upon a display device. And U.S. Pat. No. 5,398,131 and Faris, SID 91 DIGEST, 1991, pp 840–843, Micro-Polarizer Arrays Applied to a New Class of Stereoscopic Imaging, describe using a PEM for hardcopy purposes. Hall and Johnson U.S. Pat. No. 5,398,131 describe a method of encoding photographic film with polarization inducing CLC material and laminating said encoded film to produce a film presenting both polarization encoded SPVs when projected upon a polarization preserving screen and having said polarization encoded SPVs, decoded to the viewer, by means of polarization decoding glasses, which transmit to each of the viewer's individual eyes only the image intended for that eye. Many of the aforementioned displays require special cameras to record stereoscopic scenes and analyzing glasses to present them to a viewer. And in the past stereoscopic cameras have largely been duplicates of monoscopic cameras, with one exception being a camera for use with PEM displays. This is a video camera using the PEM technology to produce a display that is tailored for PEM type display devices. The video from this camera has both SPVs interlaced in each frame of video, so that when the video is displayed by a device having the proper polarizing stripes registered to the display, a stereoscopic image is observed by a viewer wearing the proper polarization analyzing glasses, wherein only the SPV intended for each of the viewer's eyes is presented to the eye for which it is intended. Such a camera is marketed by V Rex, a subsidiary of Revco, Inc. of Hawthorne, N.Y., but no description of its technology was found in the patent record, relative to a similar device of this invention.

This invention is based upon the special properties of filter/mirrors utilizing CLCs, which have the physical property that depending upon the direction and rate of twist (pitch) of the molecules in the LC structure, they will reflect one color and handedness of light that is substantially circularly polarized, while transmitting all other colors and handednesses of the incident light, so that this light may subsequently interact with other species of the LC, i.e. those having different reflective color and/or handedness, cf. Schadt & Funfschilling, 1990 Jpn. J. Appl. Phys., vol. 29, No. 10, pp 1974–1984, New Liquid Crystal Polarized Color Projection Principle. The orientation of the LC molecules (alignment) is critical, with some types of the CLC being self aligning, e.g. micro-encapsulated inks, and most other types of the CLC material will readily align from the effect of an alignment layer or treatment of the substrate or the effect of being deposited upon an aligned LC layer. These CLCs can be used to fabricate PEM structures on transparencies for stereoscopic encoding.

In FIG. 1, the spectral distributions for a family of CLCs (1, 2 & 3) are illustrated. These distributions were selected so that the combination of the CLCs will produce a white color in the reflective mode or a black in the transmission mode, i.e. where the combination of the CLCs will reflect all the light of one/or both handednesses incident upon them. The CLCs can be configured in several ways, as described in the U.S. Pat. No. 5,398,131 and the embodiment that is most applicable in the devices of the present application is a LC material developed by Wacker Chemie GmbH of Munchen (Munich), Germany. The company identifies these materials as "Crosslinkable Cholesteric LC-Silicones" (CCLC-S). These materials become highly liquid only at somewhat elevated temperatures (60° to 90° C.), which Wacker Chemie refers to as the "activation temperature". This is also the temperature at which the material assumes its LC properties and at which temperature the alignment of the LC must be performed, after which the LC can be made into solid films by either a photo or thermal "set" process, when suitable agents are added to the material, cf. Maurer, SID 90 Digest, 1990, pp 110–113, Polarizing Color Filters Made From Cholesteric LC-Silicones.

An application for this CLC material as well as such LC materials in other forms, is in the fabrication of what is called a Polarization Encoded Medium (PEM), as described in Disclosure Document Number 260862 filed with the U.S. Patent and Trademark Office on Aug. 16, 1990; U.S. Pat. No. 5,398,131; Venolia patent, U.S. Pat. No. 5,050,961; and Faris. In its simplest form, a PEM is a piece of print media containing an array of alternating handedness, polarizing stripes used to encode spatially distributed SPVs, which when viewed with polarization analyzing glasses will direct the individual perspective views to the intended eye of the viewer (the stripes are referred to as "tiles" by Venolia and Faris calls them "micro polarizers" or "micro-pols". In this embodiment of the invention a PEM can be fabricated by merely printing and aligning the CLC in stripes with some or all the colors of LC materials, superimposed and having alternating handedness between adjacent polarizing stripes (4) on the print media (5), in FIG. 2. The details of the printing and aligning processes for various formulations of the CLCs can be found in the aforementioned patent U.S. Pat. No. 5,398,131. And, when printed on a transparent medium, the PEM can be used to encode electronic displays, e.g. LC, Plasma or Electroluminescent (EL) panels, for stereoscopic displays, following the teachings of Venolia. And in the hardcopy application, a SPV (7 or 8) is printed on each set of encoding stripes (4) having the same handedness and printed with conventional nonscattering transparency inks or waxes (6), in FIG. 3. These transparency inks have the property of absorbing light of a particular color in proportion to the number of color centers in the ink, which is generally proportional to the amount of ink used. In photographic film, the number of color centers remaining in the emulsion, is proportional to the number of color centers activated in the exposure process. The color of the ink in this case is defined by the color which it absorbs, being matched to the colors reflected and transmitted by the PEM layers, so that where no ink is deposited on a PEM element, that color is reflected and transmitted (on transparency media); to obtain "white", no ink is deposited and to produce "black" all colors matching the PEM layers are deposited. When a PEM is used on photographic film, the color layers of the film serve the same function as the transparency inks. Thus in both reflection and transmission, the encoding of the PEM is a subtractive or color negative process. In this way the polarization encoding function of the display is separated from the spatial intensity and color encoding of the SPVs. But this comes at the expense of a sizable loss of spatial resolution in the stereoscopic display.

SUMMARY OF THE INVENTION

The loss of spatial resolution and the appearance of "dead areas" in the display can be reduced by several means. One such means is illustrated in FIGS. 4, where each polarization encoding CLC layer of the PEM is laterally displaced or misaligned relative to the other CLC color layers, thus when properly "encoded" with the SPVs, the images intermix to some degree, while some of the colors in the two SPVs become slightly displaced in one direction, with the displacement remaining small enough that the eye will merge the colors into the desired combination color. The displacement of the color elements creates, what might be called "color pixels", with a color pixel being a segment of a polarizing element that can produce a portion of the image of a SPV in a color or a combination of colors that are different than the color or combination of colors of other pixels of the polarizing element. On the top of FIG. 4a, is shown the colors (designated as R, G & B), of the color pixels reflecting left handed (LH) CPL. In most cases there are, within the polarizing element, pixels that produce a combination of the primary colors and others that produce only primary colors, so that when a combination color is presented, the eye must merge the colors of the primary only pixels and sometimes the colors from some of the combination color pixels to produce the displayed color. Having pixels that are producing the combination of colors being displayed, appears to help the eye merge those colors that are individually displayed, allowing a greater displacement of the unmerged primary colors, yielding the possibility of larger color polarizing elements. FIGS. 4 illustrates some, of the many possible patterns of this "Staggered PEM" (SPEM). These figures illustrate two degrees of "stagger" or offset of the color elements.

FIG. 4a is one third offset or stagger design. For a white color in the display, the black pixel area of each SPVs is only ⅓ as large as the black pixel area of a conventional (aligned color elements) PEM and for two colors in the display, the black pixel area is increased to ⅔ as large as the black pixel area of a conventional PEM. For colors that are not merged within a "color pixel", the distance between the centers of the "color pixel" of merging colors is the width of one color element, both within the polarizing element (intra polarizing element) and between polarizing elements of the same SPV (inter polarizing element). There are five color pixels per polarizing element, with one color pixel capable of producing any combination of all colors and four color pixels producing primary colors or combinations of two primary colors in the polarization element. The definition of "color pixel" is unique in that a "color pixel" can sometimes have more that one shade of one or a combination of colors within the "color pixel" when encoded with intensity modulating transparency inks. FIG. 4b is a half or 50% offset design, which offer additional compromises. In this design, there are only four color pixels per polarizing element, none of which produce a "white", yet for a white object in the image (SPV) there are no dead areas or black pixels in the image between the polarization elements of each SPV. The centers of the color pixels requiring color merging by the eye are separated by the width of one color element (edge separation of these color pixels is one half of a color element's width), both intra and inter polarization element. By using the SPEM technique, larger PEM polarizing elements can be used, which is of advantage in some applications, such as on photographic film, where the PEM elements must be made very small. The printing or writing of these SPEMs is performed much like that of any other PEM, with the exception that in some applications the color of the PEM element, as well as the handedness of the element must be identified before writing the proper SPV over it. In other applications, such as on photographic film, the assignment of the "designated write areas" are made by the PEM itself, and the proper registration of the PEM to the write areas is automatic. The reasons that a SPEM and other methods of intermixing the SPVs, greatly improve the display are based upon human perception. The SPEM gives improved edge definition of objects in the image, while reducing the color definition, which is to say that the SPEM yields higher spatial frequency, while lowering the color frequency. And the high spatial frequency is very important in the perception of objects in an image, while the color frequency is relatively unimportant. The human brain easily fills the color to the edges of the objects in the image, but it has difficulty in creating edges on poorly defined objects in an image. An important application of the PEM and particularly the SPEM is the pictorial encoding of photographic film, and in particular, motion picture film. In this function the PEM or SPEM performs an analyzing function, wherein only light of specific color and polarization orientation is transmitted to a recording target. FIG. 5 illustrates a simple stereoscopic camera, for use with a PEM target. This design also uses CLC filter/mirrors to polarize the light for the two SPVs and combine the SPVs upon the target. Referring to FIG. 5, the camera consists of two objective lenses (9), capturing the light to form individual SPVs, and a number of three layer CLC filter/mirrors (10 & 11). The CLC filter/mirror # 10 reflects all colors of one handedness of CPL, while the filter/mirror # 11 reflects all colors of CPL of the opposite or orthogonal handedness and each set of filter/mirrors transmit all colors of CPL other than that which the filter/mirror reflects, so that these elements act as both a filter and a mirror in this device. The remaining elements of FIG. 5 are the PEM (12) and the target (13). In most cases these elements are combined into a single unit, e.g. a PEM printed on photographic film or a PEM printed on a CCD array, of a video camera. In FIG. 5, unpolarized light (14) enters the camera through the objective lenses (9), whereupon it encounters the first CLC filter/mirrors. In the upper segment of the illustration, it is shown that one handedness of the unpolarized light (14) is reflected as CPL of one handedness (15), whereas the other handedness of CPL (16) is transmitted by the initial filter/mirror (10) and the initial filter/mirror (11) of the lower segment of the illustration, reflects and transmits the opposite handednesses of CPL. The transmitted CPL of each segment is directed to light absorbers (17) and the reflected light of each segment is again reflected by another CLC filter/mirror of the same type as each segment's initial filter/mirror. But if individual color filter/mirrors are used, rather than a multi-layer filter, where one very thin (few micron) layer (color and handedness reflecting CLC) is deposited directly upon another, then the first and third filter layers should be reversed between the first and second CLC filter/mirror, in order to maintain the same path-length for all colors of the light directed to the target.

As noted, the filter/mirrors (11) of the lower segment of the illustration are transmissive to the CPL reflected by the upper segment filter/mirrors (10), so that the light forming both SPVs can be combined at the lower segment's second filter/mirror, sending the polarization encoded light of both SPVs to the PEM (12), with the PEM allowing the light from each SPV to reach portions of the target (13), only in that area of the target assigned for that SPV. In the case of photographic film, this assignment is the assignment made by the PEM itself. Note that exposing the film's emulsion through the PEM will generally require exposing the emulsion through the emulsion's substrate as well, since it is very difficult to apply the PEM directly to the emulsion and maintain its integrity throughout the processing of the film. So that in the exposure of the film, the light will generally first pass through the PEM, then the film's backing or substrate and finally into the emulsion, where the exposure occurs. And in projecting the image contained on the film, the light will generally first pass through the pictorially and color encoded emulsion, then the film's substrate and finally through the polarization encoding PEM. And when used in this way, any birefringence that may exist in the film's substrate or emulsion has no consequence upon the display.

BRIEF DESCRIPTION OF THE DRAWINGS

FIG. 1 is an illustration of the spectral response of CLC materials that are generally available from LC suppliers.

FIG. 2 illustrates an unwritten PEM. Polarizing stripes (4) of alternating handedness are printed adjacent to each other.

FIG. 3 illustrates a written PEM. Where transparent inks (6) are printed on the polarizing stripes (4) of FIG. 2. The SPVs (7 & 8) are printed in an interlaced manner.

FIGS. 4 illustrate the configuration of staggered polarizing color elements in a SPEM.

FIG. 4a illustrates staggered polarizing color elements having ⅓ offset with each color of both handednesses in a layer dedicated for that color and having the colors of a single handedness being linearly displaced relative to each other.

FIG. 4b illustrates staggered polarizing color elements having ½ offset with each color of both handednesses in a layer dedicated for that color and having the colors of a single handedness being linearly displaced relative to each other.

FIG. 7 illustrates a stereoscopic projection means to display the recorded stereoscopic display produced by the camera of FIG. 6a.

DESCRIPTION OF THE PREFERRED EMBODIMENTS

Figure 5:
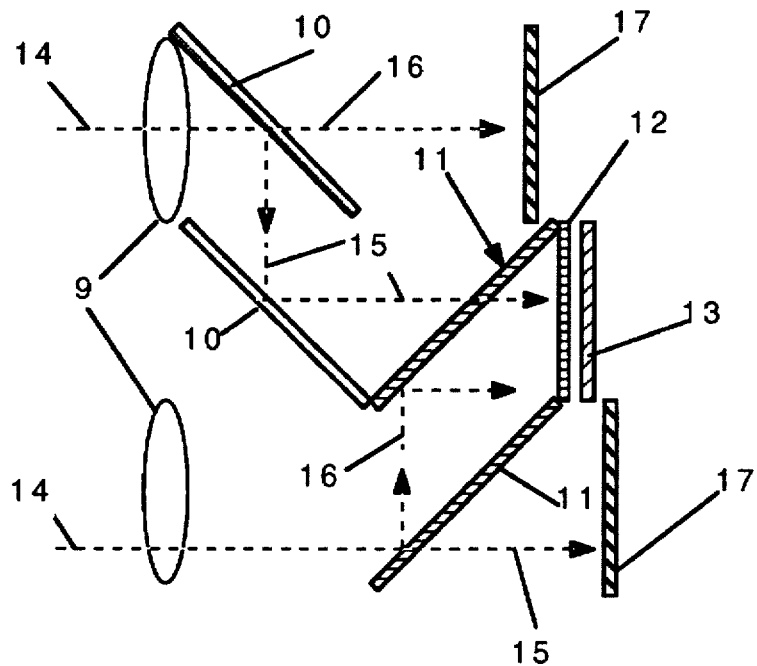
FIG. 5 illustrates a stereoscopic camera using CLC filter/mirrors (10 & 11) to direct, polarize and combine the light from two stereoscopic perspective views of a scene, onto a light sensitive target (13), containing a PEM (12).
Figure 6A:
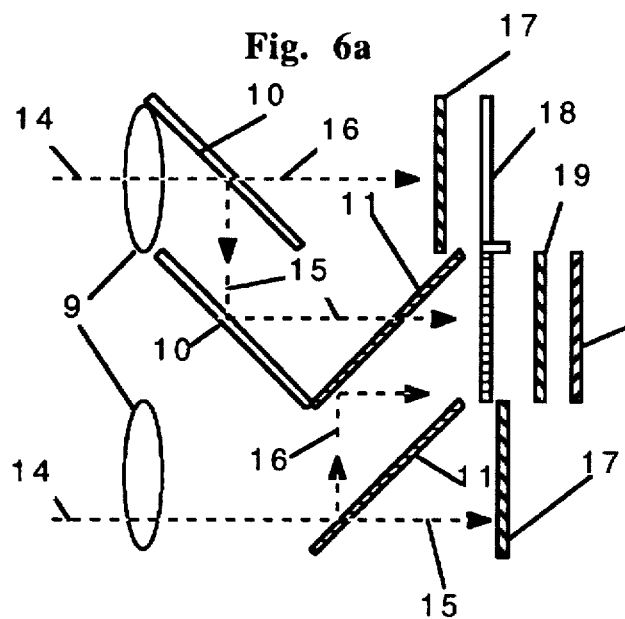
FIG. 6a illustrates a stereoscopic camera using CLC filter/mirrors (10 & 11) of mixed polarization handedness to direct, polarize and combine the light from two stereoscopic views of a scene, onto a light sensitive target (13), with said light being polarization switched by the polarization inversion element (18) and modulated by a polarizer (19).
Figure 6B:
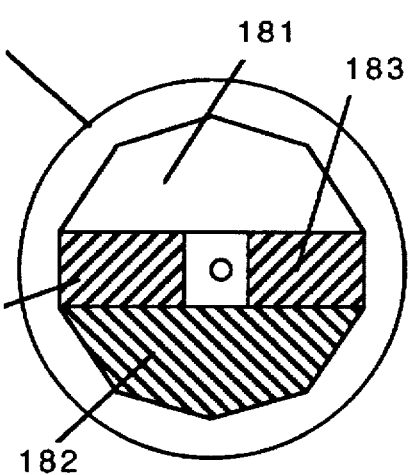
FIG. 6b illustrates the end view of the polarization inversion element (18).
Figure 7:
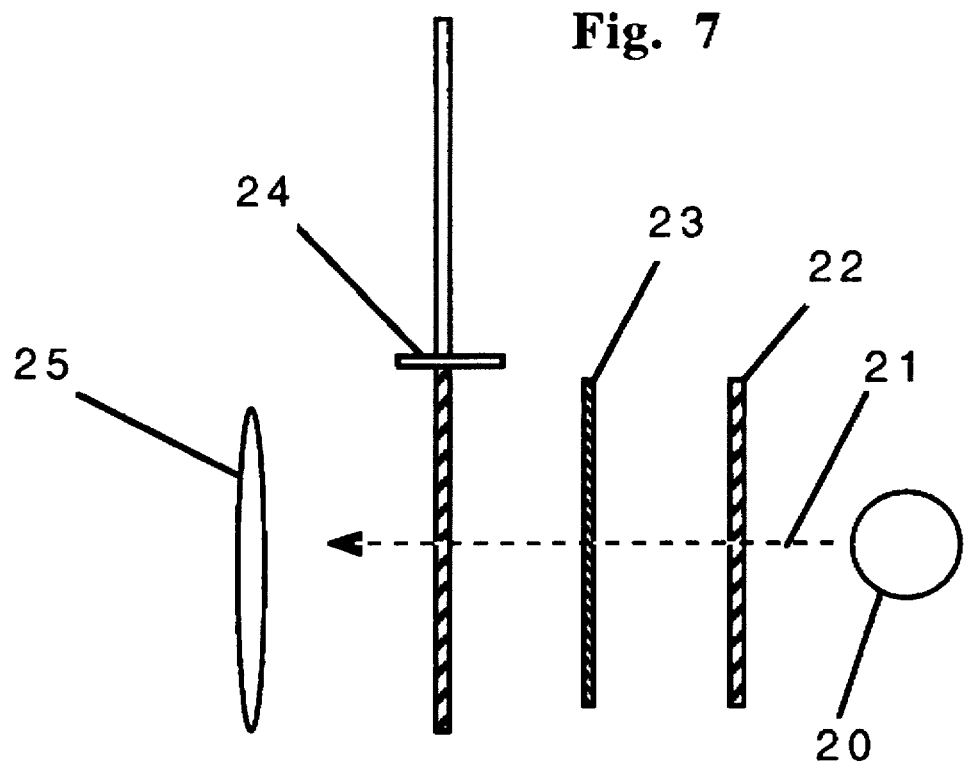
Figure 8:
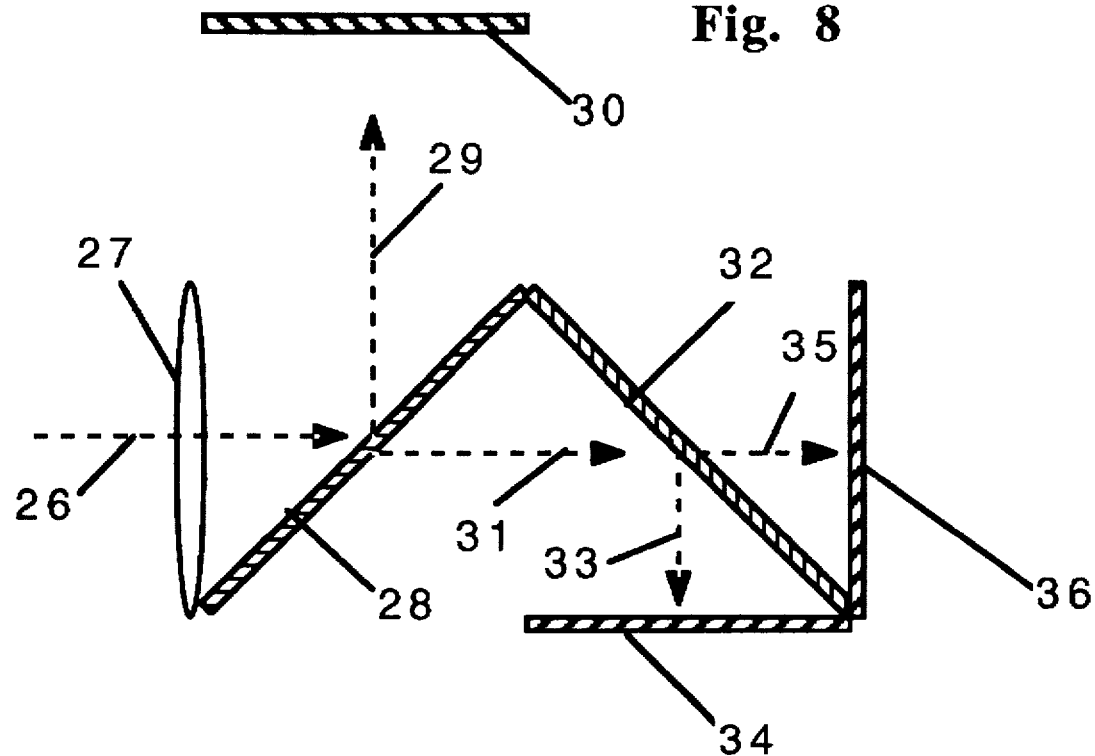
FIG. 8 illustrates a camera using CLC filter/mirrors (28 & 32) to separate the light into three component colors (29, 33 & 35) and direct said light to light sensitive targets (30, 34 & 36).
Figure 9:
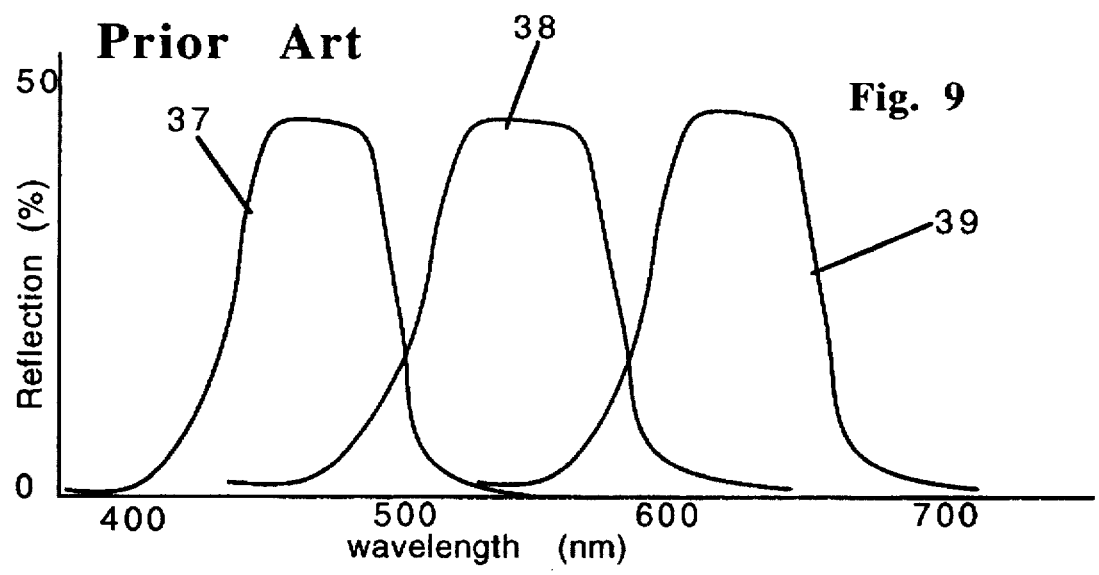
FIG. 9 illustrates the spectral response of CLC filter/mirrors having a narrower color range than those of FIG. 1.
Figure 10:
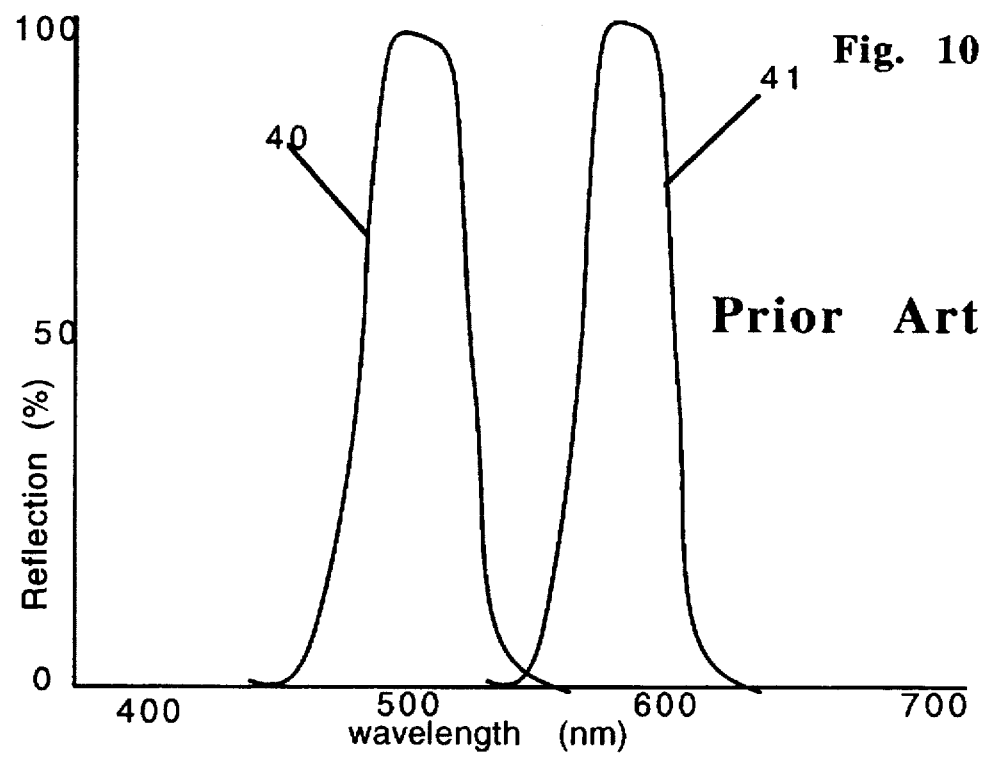
FIG. 10 illustrates the spectral response of CLC notch filter/mirrors.

Encoding the stereoscopic display on a single roll of film by using PEM encoding of the film creates an opportunity for the owner of the film to protect his intellectual property. A PEM encoded film is very difficult to copy, particularly if there are irregularities in the PEM pattern, because the PEM elements of the master and copy would have to be aligned and kept aligned, for every frame throughout the entire copy process. This would involve frame by frame matching, in the dark so as not to expose the copy film. So, PEM copies can be sold without any concern that they might be copied. However, making PEM film copies from the film of the conventional two camera process or from stereoscopic video tape(s) is very simple, with a PEM "copy camera", based upon the design of the camera of FIG. 5. The two master films, or copies thereof are merely projected through the lenses (9) and the images focused upon the PEM encoded film in the copy camera and the projected light forming the two SPVs is polarization encoded by the filter/mirrors (10 & 11), combined and impinged upon the PEM encoded copy film, which is as simple as making any other film copy. In encoding a picture for stereoscopic viewing, one normally thinks of the period of the encoding stripes or other pattern to be very fine, so as not to be easily resolved by the eye, and this is certainly true for static pictures. But in using a PEM to encode motion picture photographic film for stereoscopic viewing, the period (one stripe or other pattern element of each polarization) of the PEM may extend over two frames of the film and even if the polarization encoding is done on a much finer basis, the pattern relative to the frame format, may not necessarily repeat for two frames of the film. In this way, the encoding stripes or pattern of the individual SPV can be interlaced to present a complete SPV for each eye, on a frame sequential basis. And when SPEM encoded images are interlaced in this way, the complete complement of colors are produced for each color pixel area. When, only the two SPVs are interlaced and there is no interlacing of the individual SPVs, so that only half of each SPV is presented to the viewer, good stereoscopic effects are presented to most viewers, particularly if the picture is rapidly changing, e.g. a moving scene. And in this configuration, the film and shutter speed can remain at the standard rates with no noticeable increase of "flicker". However, when the individual SPVs are interlaced to present a complete picture of each SPV, flicker becomes very noticeable if the film and shutter speeds are not increased, so that operating in this mode consumes more film, but not necessarily substantially more film, since the increased film and shutter speeds are very dependent upon the pitch of the PEM used. The coarser the pitch of the PEM, the greater the required film and shutter speed, for most viewers to be comfortable with the display. There is another technique, unique to the CLC type of PEM, which greatly reduces the apparent flicker in most applications. The technique is to use polarizing elements of mixed handedness, and placing the color fields of the two SPVs in each PEM polarizing element. The most successful combination of handednesses is usually found in making the PEM reflect or transmit green light of one handedness and red and blue of the opposite handedness, in every segment of the PEM and in this case, printing the individual SPVs on one handedness of color elements (which exist in two polarizing elements). The technique is based upon two factors of human vision: first the eye is most sensitive to green light and most colors contain at least some green light; secondly, our awareness of flicker is increased when viewing brightly illuminated images, of generally desaturated colors, which by definition contain a large white component. Thus, when viewing such images with mixed handedness PEM elements, in the individual SPV interlace mode, each eye receives stimulation from all parts of the display of bright objects in the image, in every frame, receiving the different component colors or color fields of the image sequentially, i.e. the green field in one frame and what ever other colors are mixed with the green to form the displayed color, in the next frame, and the repetition frequency is sufficient to blend the colors and minimize the flicker. The physiology of this technique is that the black and white receptors of the eye (rods) have a much faster response time and thus detect changes, such as flicker of the display, far more readily than do the color receptors (cones) of the eye, and while cones respond only to specific colors, the rods respond to all colors, so to prevent flicker, the rods must be stimulated more frequently than do the cones, which is what this technique does. Also note that the response time of both rods and cones is very intensity or brightness dependent, with these sensors responding more quickly to bright objects in the image field, than to dim objects in the field, so that it is most important to have a higher refresh rate, for bright objects in the image field, which is, again, what this technique does. With the technique as presently described, the light for each SPV is of a single handedness or orientation and total spectrum circular polarizers can be used in the lenses of the analyzing glasses. It is also possible to make analyzing glasses with the CLC materials that transmit to each eye, light of mixed polarization handedness or orientation. There are reasons that such a configuration may be desirable. It becomes possible to mix the images of the two SPVs in a single PEM polarization element, that element having only one polarization orientation. The merit of this lies in the fact that stereoscopic cameras and projectors can be designed that operate with ordinary color film and either mechanically or electronically perform the function of the PEM. Such a camera is illustrated in FIG. 6a. This camera is similar to the camera of FIG. 5, and operates much the same. There are two embodiments of the camera, with both embodiments producing the same stereoscopic encoded photographic film or video signals. Both embodiments of the camera encode the stereoscopic pictures on common color transparency photographic film or video target. In the first embodiment, the camera directs the light of the scene exactly as the camera of FIG. 5, until the light of the two SPVs reaches element # 18, which is a shutter and a switchable retarding polarization inverter. The element # 18 has been illustrated in FIG. 6b as a rotating disk with two windows (181 & 182) through which the light can pass, for the purpose of impressing an optical image upon the target (13), which can be either photographic film or a video pickup target, such as a CCD. One window (181) in the disk may be an aperture or a transparent non-birefringent medium. The second window (182) contains a half wave optical retarder, which when placed in the light beam will invert or change the handedness of CPL passing through it. The shutter element (18), could also be a linear shutter arrangement or a mechanical shutter with an electronic variable retarder, such as those cells which vary the retardation of a birefringent liquid crystal and thereby switch between a half wave of retardation (when "off") to an element having no or a slight degree of retardation (when "on"). Thus, CPL from both SPVs, is either shuttered "off", by the shutters (183) when the film advances or the video target is "readout", or the light is allowed to pass through one or the other windows (181 or 182) of the element (18). When the CPL of both SPVs pass through one of the windows of the shutter, it impinges upon element # 19, which is a CLC filter/mirror, having three CLC layers, with two of the layers reflecting CPL of one handedness and the third LC layer, reflecting CPL of the opposite handedness, with each of the CLC layers reflecting one of the colors of light to which the film is sensitive. And if the film is sensitive to more than three principal colors, then more CLC layers are used, with the handedness of the light reflected or transmitted being somewhat balanced to transmit about equal brightness (brightness being a subjective measure of luminous flux density) of each handedness of the light to the target (13). Some amount of unwanted light from the two SPVs will pass through the CLC polarizer (19) because the half wave retarding window can not be made to give the same amount of retardation for all colors. But to achieve a balance in the amount of unwanted light (from elliptical polarization) in the two SPVs and possibly keep the unwanted light below the reciprocity level of the film, centiwave retarders can be incorporated into some of the CLC layers of the final polarizer (19). Patent application Ser. No. 08/291,666 teaches that the retardation of the combination of the centiwave retarder and other such retarders of the system can be continuously varied by merely rotating one retarding element relative to the other retarding elements of the system. In this way the centiwave element can be made with more than sufficient retardation to effect the desired change of polarization and then merely be rotated to achieve the desired result. This then greatly simplifies the use of centiwave retarders in these applications. The light not reflected by the final polarizer (19), is transmitted to the target (13). This light will contain the light from one SPV in two colors and the light from the other SPV in the third color. And when the light passes through the other window in the shutter (18), which occurs in the next frame of the film or frame of video, the light arriving at the target will be of one color of the said one SPV and two colors of the said other SPV, completing both SPVs. In the second embodiment of this camera (FIG. 6a), the light directing and polarizing CLC filter/mirrors (10 & 11), reflect light of mixed handedness, so that the CPL arriving at the shutter (18) is of mixed handedness within each SPV. The shutter (18) performs as described earlier, but the final polarizing filter (19) is a single handedness circular polarizer. With this arrangement, the amount and color of the light arriving at the target (13) is substantially the same as that in the previous embodiment. Note, that in the use of CLC filter/mirrors controlling colored light, it is preferable if the spectral distribution of the colored light is somewhat narrower than that of the CLC controlling each specific color, which can be done through the use of "notch filters". Because some of the color is presented to the viewer temporally, one might think that color integrity and edge definition of rapidly moving objects in the stereoscopic image might be lost, but this is not the case, because all the colors of the object exist in each frame and only the balance of colors to each eye of the viewer changes frame to frame, which the viewer's brain seems to integrate very well. The projection of individual SPV interlace on film or video can be performed by the device of FIG. 7, which is illustrated for the projection of film (22). In this illustration a light source (20) produces light (21) that is spatially and color encoded by motion picture film (22), whereupon the unpolarized light proceeds to a polarizer (23), which polarization encodes the colored light of this display. This element (23) can be either a total spectrum circular polarizer of either conventional or CLC type or it can be a mixed handedness polarizer of the CLC type. If the polarizer (23) is of the single handedness type, then polarization decoding glasses of the mixed polarization type must be used and if the polarizer (23) is of the mixed handedness type, then conventional or CLC, single handedness decoding glasses may be used by the viewer. Having been polarization encoded, the light proceeds to the shutter/ polarization changer or polarization switching element (24), which is of the same construction as the same element found in the camera of FIG. 6a and illustrated in FIG. 6b. The color, spatial and polarization encoded light then proceeds through the projection lens (25) to a polarization preserving screen (not shown), where it is reflected to the eyes of the viewer, through the polarization decoding glasses, described above. An additional item of this projection system, which is not shown, is a condensing or collimation lens between the light source (20) and the film (22). It may also be advisable to place a CLC Infra Red (IR) filter/mirror at the collimation lens, to minimize the heating of the system components. This is a CLC filter mirror made of two layers, each layer reflecting the opposite handedness of IR as that of the other. It may also be beneficial to incorporate "notch filters" in the light source. In the case of video projection, the light source (20) and the photographic film (22) are replaced by a projection display device. Another camera arrangement utilizing CLC filter/mirrors is illustrated in FIG. 8. This device is a highly efficient monoscopic camera that utilizes no PEM or image mixing optics and two separate and identical cameras are used to produce the SPVs in stereoscopic applications. The device finds application in: producing video for the stereoscopic display device of patent application Ser. No. 08/291,666; as an SPV image mixing video camera; as an alternative way to expose the three film layers of each SPV for the stereoscopic photographic process of patent U.S. Pat. No. 5,398,131; and when configured such that the targets (30, 34 & 36) within the camera are replaced with monochromatic display elements, the camera is transformed into a highly efficient projector. This device contains two CLC filter/mirrors, each of which is comprised of the CLC material, reflecting both handedness of one color. And these filter/mirrors should be of the multi-layer (CLC layer deposited upon CLC layer) type to avoid geometry and focus problems resulting from path length differences for the two handedness of the reflected light. In the FIG. 8 illustration of the camera, unpolarized light (26) passes through the objective lens (27) and travels to the first CLC filter/mirror (28), where one color of the light of both handednesses (29) is reflected out of the beam. This first color of light (29) is directed to and focused upon the target (30) of the first color. The light (31) which was not reflected by the first CLC filter/mirror (28) travels to a second CLC filter/mirror (32), whereupon a second color of both handednesses (33) is reflected out of the beam, to the target (34) of the second color. The remainder of the unreflected beam (35) constitutes the third color and this light (35) proceeds to the target (36) of the third color. This camera provides both high resolution and high sensitivity, since a photographic quality image is delivered to the targets with no significant amount of light being absorbed by the filter/ mirrors. This system also has the advantage that the objective lens(es) do not need to be chromatically corrected to any significant extent, since the individual target positions or locations can be adjusted slightly to compensate for differences of the color image locations resulting from dispersion of the objective lens(es). This is to say that the image focus can be adjusted for the three colors individually. Also the angles with which the CLC filter/mirrors are inclined relative to the axis of the device are unimportant, as long as the reflected light will be able to proceed to the individual targets unimpeded and undistorted, but since the light does encounter the filter/mirrors at an angle, some care should be exercised in the formulation of the CLC materials to reflect the desired spectral distribution of light at the angle with which the filter/mirrors are deployed. The targets themselves can be loosely defined. Nearly any light sensitive medium or device can be used. Commonly, a CCD target would be used for video output from the camera, but photographic film might also be used. To create the intermixed SPV image for a display application, the designated one color target of one camera is "clocked out" or "read out" the with two designated color targets of the other camera, for one frame and the selection of targets in the two cameras is reversed for the subsequent readout, having no two targets processing the same color in a single readout or frame of video. To understand CLC filter/mirrors and their incorporation in the devices of this application, some further explanation of their physical properties and parameters is necessary. CLCs are LC materials that are comprised of long molecules deposited in oriented layers with the principal axis of the molecules being slightly misaligned to the adjacent layers, such that the axis of the molecules angularly process through the layers of the deposition. This procession of orientation is referred to as "chiraling" of the molecules or of the LC. The first layer of molecules must be oriented on the substrate and this is referred to as aligning the LC. Chiraling the molecules is done by adding a chiraling agent, which is a molecule that attaches itself to the host LC molecule causing the LC molecules to orient themselves slightly misaligned to its substrate or the layer of molecules in the adjacent layers. Different chiraling agents attach themselves differently to the host molecule, such that some chiraling agents cause the LC molecules to twist (chiral) to the right and others will cause chiraling to the left, thus right and left hand chiraling is possible, resulting in what is called right hand and left hand CLCs. Interestingly the rate of twist is chiefly governed by the amount of chiraling agent used, rather than the kind of agent used. And the rate of twist, relates to the color of CPL that the CLC will reflect, with the average wavelength, based upon the average velocity of the light in the birefringent LC, being that of the center color, being equal to the pitch of the CLC "helix". The spectral distribution of the reflected light is governed by the birefringence of the CLC, such that CLCs that are highly birefringent, having broad spectral distributions, while those with a small birefringence having narrow spectral distributions. The final property of interest concerns the physical nature of the light reflected by the CLC. This light is generally accepted as being circularly polarized, but in fact this is only true at the center color and in examining the polarized light of other colors, shows that as the color of the light differs from the center color, the light becomes slightly elliptically polarized, becoming highly elliptically polarized over a very narrow band at the edges of the spectral distribution. This then illustrates the importance of matching the spectral distribution of the CLC filter/mirror to that of the display colors in some applications. Most displays, including: CRTs; those with florescent light sources, or other phosphor based source; will generally have light of fairly narrow spectral bands and there is little difficulty in matching the spectral distributions of the source and that of the CLC filter/mirrors. But other light sources such as the hot tungsten filament and sunlight have a continuous spectral distribution. And in applications utilizing these light sources, it may be expedient to use notch filters if the spectral distribution of the filter/mirrors is not sufficiently broad. FIG. 1 illustrates CLC filter/mirror polarizing color distributions (1, 2 & 3) that are sufficiently broad and well matched to each other, to modulate continuous spectrum visible light. Whereas, the spectral distributions (37, 38 & 39) of the CLC filter/mirror polarizing colors illustrated in FIG. 9 are somewhat narrower, yet reasonably well matched. These distributions should prove very adequate for most display purposes and for certain reasons of cost and performance of the CLC filter/mirror, one may wish to use these filters in applications utilizing a continuous spectrum light source. If this is done without regard for the consequences, a reasonable amount of ghosting of the undesired SPV will be present in stereoscopic displays. However, the addition of inexpensive CLC notch filters (40 & 41), as illustrated in FIG. 10, will eliminate the chief source of ghosting in this display. The notch filter/mirrors can be of single or dual handedness and they transmit or reflect out of the display the light over a narrow spectral band, so that there is no light at the edges of the spectral distributions of the CLC color elements. In fact, if narrow spectral distribution CLC filter/mirrors are used in the reflection of the display or recording light, as in the cameras of this invention, these elements create their own notch filtering, because the undesired light is separated from the desired light by the light directing and filtering of these elements. Notch filters of dual handedness are illustrated in FIG. 10 and they can be placed at any point in the display system, e.g. at the light source; at the projection or objective lens of a projector or camera; in the analyzing glasses of the viewer.

These and other embodiments can be practiced without departing from the true scope and spirit of the invention, which is defined by the following claims.

What is claimed is:

1. An apparatus for the recording of stereoscopic images, said images being comprised of first and second images, each having at least first and second color fields, said apparatus comprised of:

first and second lenses, transmitting light forming the color fields of the respective first and second images, and polarization encoding means, wherein the light of each of said first and second color fields of each of said first and second image is polarized in one of two substantially orthogonal polarization states, wherein the polarization orientation of the light of said first color field of said first image has an orthogonal polarization orientation to the light of said first color field of said second image and the polarization orientation of the light of said second color field of said first image has an orthogonal polarization orientation to the light of said second color field of said second image, and an image combining means, wherein the polarization encoded light forming the color fields of said first and second images is directed to form coextensive images upon a recording target, and polarization analyzing means, wherein at least segments of the polarization encoded color fields of said first and second images are selectively directed to said target, and a recording target, wherein at least segments thereof are sensitive to the light of said color fields.

2. An apparatus for the recording of stereoscopic images, said images being comprised of first and second images, according to claim 1, wherein said analyzing means comprises:

at least one substrate having at least one surface, said surface being resolved into an array of polarization analyzing area elements distributed in at least one dimension, the area elements being in first and second sets such that each area element of the first set is separated in said one dimension from other area elements of the first set by at least one area element of the second set and each area element of the second set is separated in said one dimension from other area elements of the second set by at least one area element of the first set, and wherein the area elements of each set are resolved into color specific area sub-elements, wherein each sub-element reduces the transmitted light by substantially removing light of one color and one polarization orientation, with said one color and one polarization of light substantially removed by the color specific area sub-element, defining the color of said sub-element, and wherein the area elements of the first set transmit polarized light, of substantially one polarization orientation for each color, and the area elements of the second set transmit polarized light of substantially orthogonal polarization orientation of the respective colors within said array of color specific polarization analyzing area elements, and wherein having substantially identical arrays of color specific polarization analyzing area sub-elements for each representative primary color of said first and second images, with said arrays of color specific polarization analyzing area sub-elements of each set being substantially ordered relative to each other.

3. An analyzing medium according to claim 2, wherein the resolution of said one surface of said one substrate is provided by at least one coating applied to said surface.

4. An analyzing medium according to claim 2, wherein the polarization analyzing area elements are distributed in a first and second dimension, having first and second axes that extend transversely of each other.

5. An analyzing medium according to claim 3, wherein said area elements are composed of layers of cholesteric liquid crystal material the reflect substantially one color and one polarization orientation of circularly polarized light, said layers constituting sub-elements of said area elements.

6. An analyzing medium according to claim 2, wherein said subelements of the sets of area elements are ordered but non-coextensive, with the sub-set of a first color of sub-elements, relative to a sub-set of a second color of sub-elements being displaced in at least said one dimension, by an amount less than the substantial extent of the sub-element along said one dimension.

7. An analyzing medium according to claim 2, wherein said subelements of the sets of area elements are ordered and substantially coextensive.

8. An apparatus for the recording of stereoscopic images, said images being comprised of first and second images, according to claim 1, wherein a switchable polarization inversion means is introduced between said image combining means and said polarization analyzing means, and wherein said switchable polarization inversion means is provided by a liquid crystal variable retarder having two switched states, wherein a first switched state provides substantially no retardation and the second switched state provides substantially one half wave of retardation to visible light passing through said switchable polarization inversion means, and wherein the first switched state, providing substantially no retardation to polarized light of one polarization orientation, has substantially no effect upon said light, and the second switched state providing substantially one half wave of retardation to said polarized light of one polarization orientation, provides said light in substantially an orthogonal polarization orientation to said one polarization orientation.

9. An apparatus for the recording of stereoscopic images, said images being comprised of first and second images, according to claim 1, wherein a switchable polarization inversion means is introduced between said image combining means and said polarization analyzing means, and wherein said switchable polarization inversion means is a mechanical structure, having at least first and second windows through which visible light can pass, wherein the first of said windows provides substantially no retardation to polarized light of one polarization orientation, and the second of said windows, provides substantially one half wave of retardation to said polarized light passing through the second of said windows, and wherein the first window, providing substantially no retardation to said polarized light of one polarization orientation, has substantially no effect upon said light, and the second window, providing substantially one half wave of retardation to said polarized light of one polarization orientation, provides said light in substantially an orthogonal polarization orientation to said one polarization orientation.

10. An apparatus for the recording of stereoscopic images, said images being comprised of first and second images, according to claim 1, wherein a switchable polarization inversion means is provided between said image combining means and said polarization analyzing means, and wherein said switchable polarization inversion means provides at least two switched states, with the first state having no effect upon polarized light passing through said means and a second state, wherein said polarized light is substantially transmuted to a state of orthogonal polarization orientation, and wherein said target is specifically a video target providing an electrical signal representative of said first and second images, with the switching of said polarization inversion means being synchronized with "read out" of said target, thus providing alternating mixtures of the individual color fields of said first and second images being imposed upon said target in alternating "read out" frames, whereby said mixtures of the specific color fields of said first and second images are recorded alternately in sequential frames of the video recording.

11. An apparatus for the recording of stereoscopic images, said images being comprised of first and second images, according to claim 1, wherein a means for the transport of said target is provided, and said target is motion picture photographic film having said analyzing means affixed to said photographic film.

12. An apparatus for the recording of stereoscopic images, said images being comprised of first and second images, according to claim 11, wherein said analyzing means comprises:

a polarization analyzing medium imposed upon at least first and second recording frames spaced along an axis, said first and all odd numbered recording frames constituting a first set of color specific, coextensive, analyzing polarizers transmitting specific colors of light in substantially a first polarization orientation for each specific color, and said second and all even numbered recording frames constituting a second set of color specific, coextensive, analyzing polarizer frames, transmitting said color specific light in a substantially second polarization orientation, which is orthogonal to said first polarization orientation for each specific color of transmitted light.

13. An apparatus for the recording of stereoscopic images, said images being comprised of first and second images, according to claim 12, wherein the polarization orientation of the light transmitted by the individual analyzing polarizer frames is substantially of a single polarization orientation within each analyzing polarizer frame, and having said first and second images being of mixed polarization orientation, wherein the polarization encoded light of the specific color fields of said first and second images being encoded with the polarization orientation of at least one color field of each of said first and second images being of orthogonal polarization orientation to that of at least one other color field within each of said images, whereby the selected color fields of both images of said first and second images are transmitted by each of said analyzing polarizer frames.

14. An apparatus for the recording of stereoscopic images, said images being comprised of first and second images, according to claim 12, wherein the polarization orientation of the light transmitted by each analyzing polarizer frame is of mixed polarization orientation, wherein said polarizer frame transmits polarized light having the polarization orientation of at least one color being of an orthogonal polarization orientation to the light of at least one other color transmitted by said polarizer frame, and having the color fields of each image of said first and second images, polarization encoded in a single polarization orientation, said single polarization orientation of said first image being orthogonal to said single polarization orientation of said second image, whereby the selected color fields of both images of said first and second images are transmitted by each of said analyzing polarizer frames.

15. An apparatus for the recording of stereoscopic images, said images being comprised of first and second images, according to claim 1, wherein a switchable polarization inversion means and a means for the transport of said target are provided, and wherein said switchable polarization inversion means providing at least two switched states, with a first switched state having no effect upon polarized light of one polarization orientation, passing through said means and a second switched state, wherein said polarized light of one polarization orientation is transmuted to a state of polarization orientation that is substantially orthogonal to said one polarization orientation, and wherein said target is specifically motion picture photographic film, and the switching of said polarization inversion means is synchronized with the advance of said motion picture film, providing alternating mixtures of the individual color fields of said first and second images being imposed upon said film in alternating recording frames, whereby said mixtures of the specific color fields of said first and second images are recorded alternately in sequential frames of the photographic recording.

16. An apparatus for the recording of stereoscopic images, said images being comprised of first and second images, according to claim 1, wherein said polarization encoding means polarization encodes the color fields of said first and second images with the polarization orientation of the light of said first color field of said first image having an orthogonal polarization orientation to the light of said second color field of said first image and the polarization orientation of the light of said first color field of said second image having an orthogonal polarization orientation to the light of said second color field of said second image.

17. An apparatus for the recording of stereoscopic images, said images being comprised of first and second images, according to claim 1, wherein said polarization encoding means polarization encodes the color fields of said first and second images with the polarization orientation of the light of said first color field of said first image is of the same polarization as the light of said second color field of said first image and the polarization orientation of the light of said first color field of said second image is of the same polarization orientation as the light of said second color field of said second image.

18. An apparatus for the recording of stereoscopic images, said images being comprised of first and second images, according to claim 1, wherein said polarization encoding means consists of CLC filter/mirrors, which polarize and direct the light forming said first and second images, said filter/mirrors being inclined relative to the direction of travel of said light incident upon said inclined CLC filter/mirrors.

19. A method of recording first and second images, said images comprising a pair of stereoscopic images, upon a recording target, with said first and second images each being composed of at least first and second color fields, and polarization encoding means whereby the light forming the individual color fields of said first and second images is polarization encoded to one of two substantially orthogonal polarization states, and a polarization analyzing means, said analyzing means being provided by a medium having at least one substrate having at least one surface, said surface being resolved into an array of polarization analyzing area elements distributed in at least one dimension, the area elements being in first and second sets such that each area element of the first set is separated in said one dimension from other area elements of the first set by at least one area element of the second set and each area element of the second set being separated in said one dimension from other area elements of the second set by at least one area element of the first set, and a recording means, said recording means being provided by a target being sensitive to electro-magnetic stimulation, said stimulation provided by light of at least one color field of said pair of stereoscopic images imposed upon said recording target, and said recording target having spatially distributed area elements coextensive with said area elements of said polarization analyzing medium, and said method comprising:

polarization encoding the light forming the color fields of said first image to a first polarization state for each of said color fields, and polarization encoding the light forming the color fields of said second image to a second polarization state, which is orthogonal to said first polarization state, for each color field, and imposing the polarization encoded color fields of said first and second images upon said first and second sets of area elements of said analyzing medium, which selectively transmits segments of said polarization encoded color fields of said first and second images to the recording target, wherein the segmented color fields of said first and second images are recorded upon said target.

20. A method of recording first and second images upon a recording target, according to claim 19, wherein the light transmitted by said first set of polarization analyzing area elements is from at least the first color field of said first image of said pair of stereoscopic images and at least the second color field of said second image of said pair of stereoscopic images, and the light transmitted by said second set of polarization analyzing area elements is from at least the second color field of said first image of said pair of stereoscopic images and at least the first color field of said second image of said pair of stereoscopic images.

21. A method of recording first and second images upon a recording target, according to claim 19, wherein said recording is imposed upon said target by virtue of the electro-magnetic stimulation affecting a chemical change to chemical agents of said target.

22. A method of recording first and second images upon a recording target, according to claim 19, wherein said recording is imposed upon said target by virtue of the electro-magnetic stimulation affecting a change of electronic state within elements of the material of said target.

23. A method of recording first and second images, said images comprising a pair of stereoscopic images, upon a recording target, with said first and second images being composed of at least first and second color fields, and a polarization encoding means whereby the light forming the individual color fields of said first and second images is polarization encoded to one of two substantially orthogonal polarization states, and a polarization analyzing means, and a means of temporally changing the color fields of said first and second images transmitted by said polarization analyzing medium, and said recording target being sensitive to electro-magnetic stimulation, said stimulation provided by light of at least one color field of the images of said pair of stereoscopic images, when said light is imposed upon said recording target, and said method comprising:

combining at least one color field of each of said pair of stereoscopic images into an image, comprising a first mixed image, and combining the remaining color fields of said pair of stereoscopic images into a second image, comprising a second mixed image, and sequentially imposing said first and second mixed images upon said target, whereby the color fields of said mixed images are recorded.

24. A method of recording first and second images, said images comprising a pair of stereoscopic images, upon a recording target, according to claim 23, wherein the temporal selection of the specific color fields of said first and second mixed images transmitted by said analyzing means is provided by temporally changing the polarization orientation of the light transmitted by said analyzing means to an orthogonal polarization orientation for each specific color.

25. A method of recording first and second images, said images comprising a pair of stereoscopic images, upon a recording target, according to claim 23, wherein the temporal selection of the specific color fields of said first and second mixed images transmitted by said analyzing means is provided by temporally changing the polarization orientation of the light forming said mixed images to an orthogonal polarization orientation for each specific color of light transmitted by said analyzing means.

* * * * *